Aug. 6, 1968     J. B. GREEN     3,395,876
AIRCRAFT WITH HOUSED COUNTER ROTATING PROPELLORS
Filed May 5, 1966     4 Sheets-Sheet 1
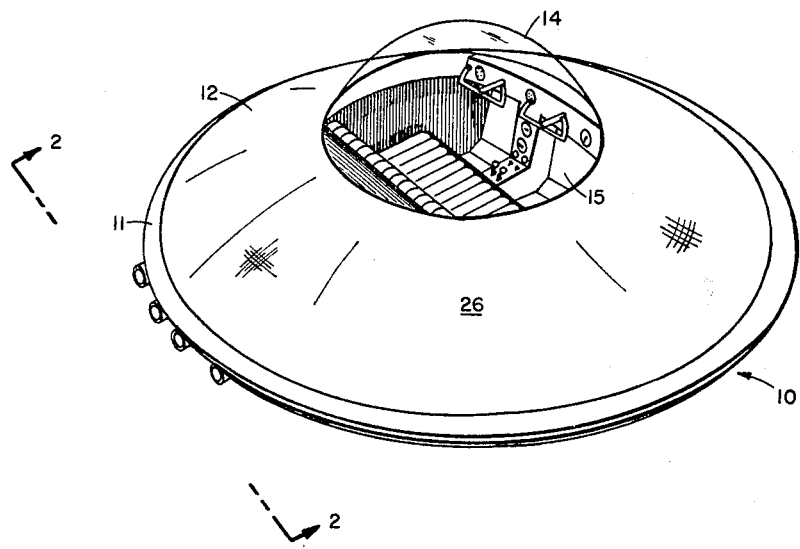
FIG. I
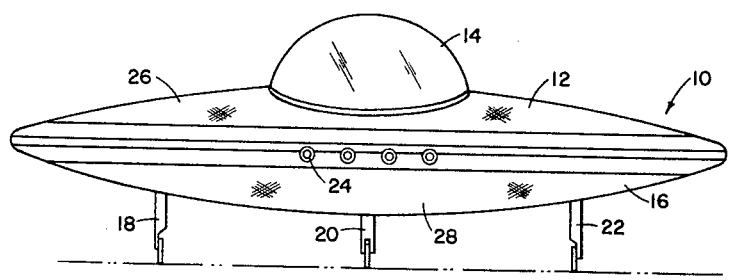
FIG. 2
Jacob B. Green,
INVENTOR.
BY
Charles G. Phillips
ATTORNEY.

Aug. 6, 1968 J. B. GREEN 3,395,876
AIRCRAFT WITH HOUSED COUNTER ROTATING PROPELLORS
Filed May 5, 1966 4 Sheets-Sheet 2
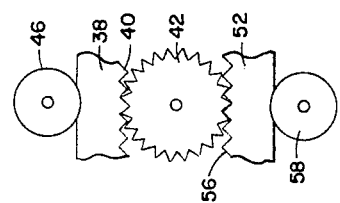
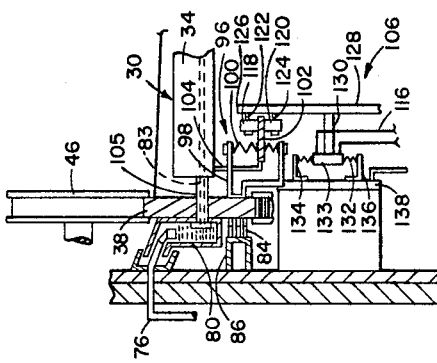
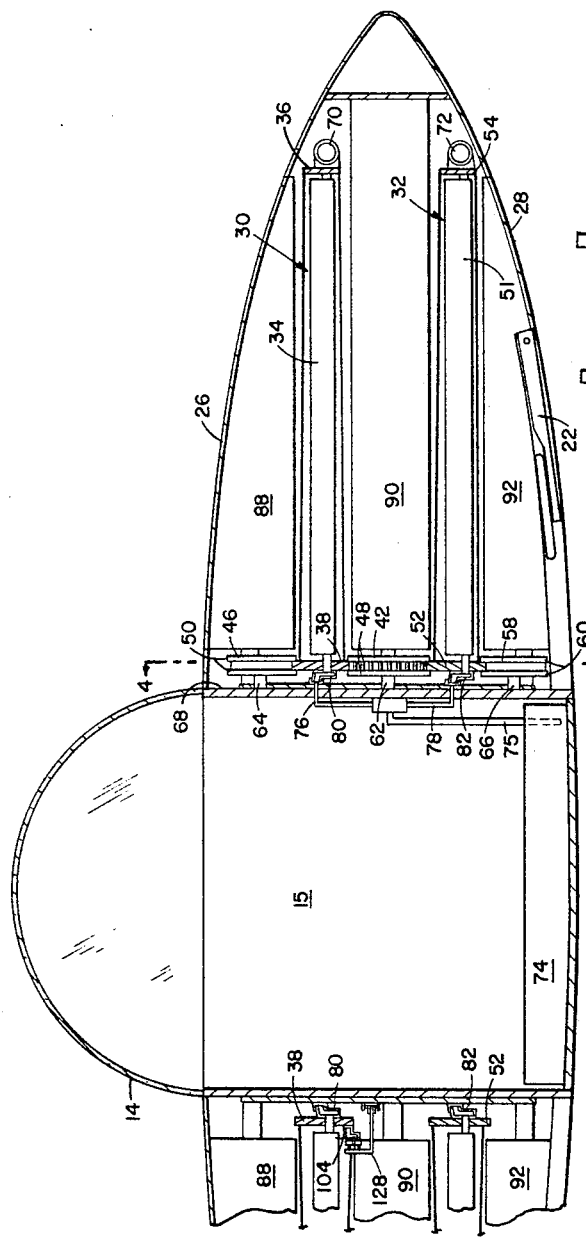
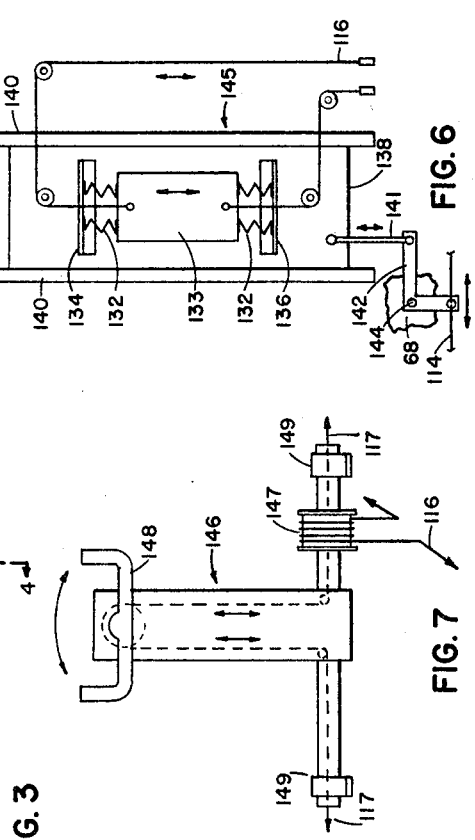
Jacob B. Green,
*INVENTOR.*
BY
ATTORNEY

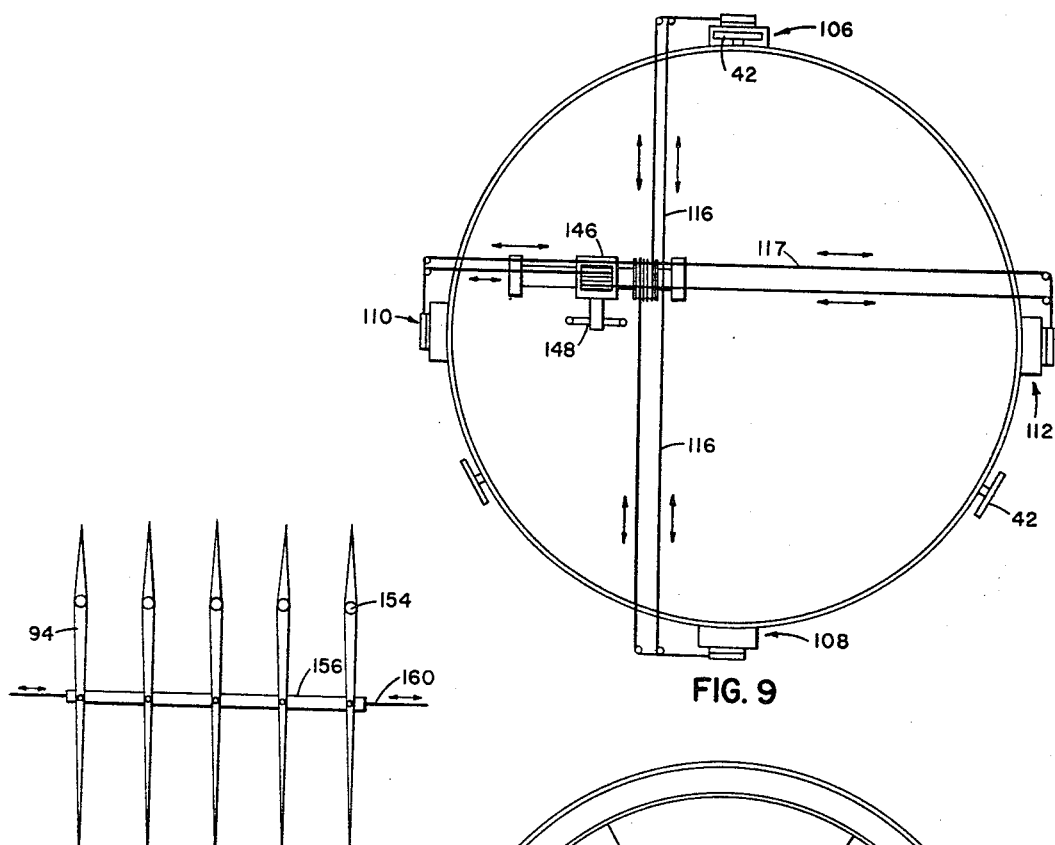
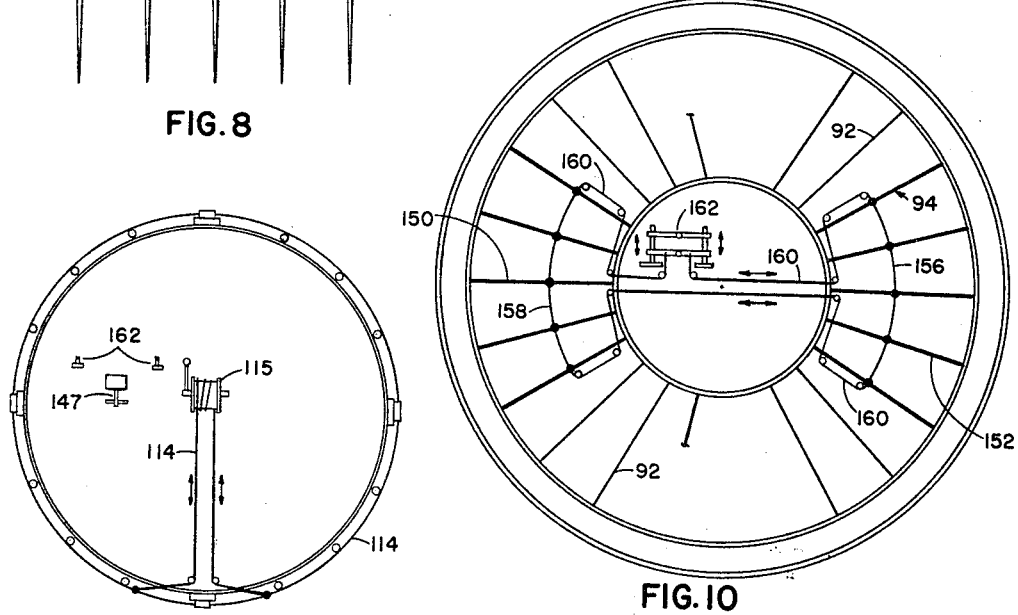

Aug. 6, 1968     J. B. GREEN     3,395,876

AIRCRAFT WITH HOUSED COUNTER ROTATING PROPELLORS

Filed May 5, 1966     4 Sheets-Sheet 4

Jacob B. Green,
INVENTOR.

BY Charles J. Phillips
ATTORNEY

United States Patent Office 3,395,876
Patented Aug. 6, 1968

3,395,876
AIRCRAFT WITH HOUSED COUNTER
ROTATING PROPELLORS
Jacob B. Green, 1419 Monte Sano Blvd. SE.,
Huntsville, Ala. 35801
Filed May 5, 1966, Ser. No. 547,905
1 Claim. (Cl. 244—23)

ABSTRACT OF THE DISCLOSURE

An aircraft capable of vertical lift having a pair of counter-rotating lift blade assemblies wherein blade pitch can be controlled to control the attitude of the aircraft.

---

This invention relates to aircraft and particularly to aircraft wherein lift is obtained directly from counter rotating fans or propellors.

The development of helicopters and other aircraft capable of vertical or near vertical ascent by means of lift propellors or fans has proceeded fairly rapidly in the past decade and thousands of such aircraft are in daily use. Unfortunately, their cost has been high and generally out of the reach of most purchasers desiring to own one. Further, while modern day helicopters are equipped and capable of taking off from the average home yard, their complexity of control as well as price make them unsuited for the average householder. Still further, while the helicopter enjoys its principal use by the military where the substantial expenditure for equipment and training of pilots can be afforded, it is obvious that if simplified and cheaper aircraft capable of performing the same missions were available, they would be widely enjoyed. While the applicant does not profess to have solved all the problems relating to aircraft in the category described, it is believed that the aircraft of his invention provides a substantial stride forward toward their solution.

Accordingly, it is an object of the present invention to provide an improved aircraft capable of vertical take off and ascent which is much more economical to manufacture and maintain than its prior counterparts.

Another object of this invention is to provide an aircraft of the category described which can be flown by persons capable of flying conventional aircraft with minimum of transition time and which may be flown after no longer than normal flight instruction time for winged aircraft by nonaviators.

Still another object of this invention is to provide a dish-shaped aircraft without external extending moving parts or wings which can be made to fly in any desired direction as, for example, straight up or down, backward, forward, or to either side at any variable speeds and also to hover or hold over a given area.

A still further object of this invention is to provide an aircraft of the category described which may be adapted for military use as a gun platform or for the performance of other duties now performed partly by the helicopter and partly by winged aircraft.

In accordance with the invention a basically circular aircraft is constructed in which lift is achieved by a propulsion chamber intregal with the aircraft body and wherein two counter rotating fans or propellors are equally driven to provide lift without net torque and with substantial aerodynamic stability. As a particular feature of the invention, air directors are built into the body structure of the aircraft and positioned on top of, between and below the counter rotating fans. In this manner, flow is directed substantially perpendicular to the fans at all times and thus the air directors prevent blade stall when the lateral speed of the aircraft exceeds fan tip speed, a difficulty presently experienced with helicopter operations.

The fans are provided with variable pitch blades to accomplish roll, pitch and vertical movement. Yaw, or azimuth, is controlled by making certain of the air directors below the bottom fan variable angle directors.

Other objects, features and advantages of the invention will become apparent from the following description when considered together with the drawings in which:

FIG. 1 is a perspective view of an aircraft constructed in accordance with the invention.

FIG. 2 is a rear view of the aircraft illustrated in FIG. 1 with the landing gear extended.

FIG. 3 is a half cross-sectional view illustrating details of construction and the location of fan rings, idler gears, air directors and cabin area.

FIG. 4 is a diagrammatic view of a portion of FIG. 3 showing idlers, gears and racks.

FIG. 5 is an enlarged view of a portion of FIG. 3 illustrating in greater detail the fuel system and commutater ring for engine electrical power and control.

FIG. 6 is one of four control stations illustrating the pitch and roll networks superimposed on the vertical control network.

FIG. 7 is a conventional control column for roll and pitch control.

FIG. 8 is an elevation view of a portion of the yaw or azimuth control directors.

FIG. 9 is a diagrammatic plan view showing four control stations, controls and rigging for roll and pitch control and the location of the three gear groups that are used to attach the fan rings to the main section of the cabin.

FIG. 10 is a diagrammatic plan view illustrating the method of yaw or azimuth control, rudder-type pedals and rigging to variable air directors.

FIG. 11 is a diagrammatic plan view illustrating the vertical control system and the rigging that is attached to each control station.

Figure 12:
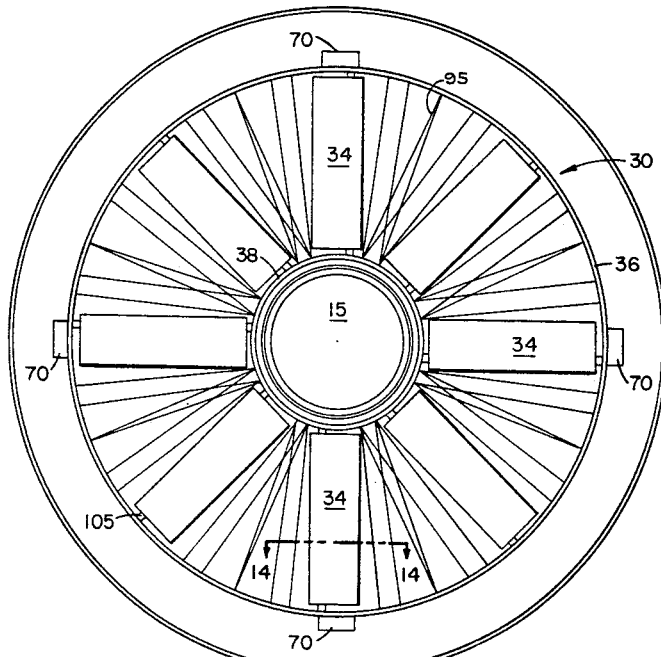
FIG. 12 is a plan view showing fan blades, power jets and air foil spokes used for strength.

Referring now to the drawings, there is shown a nonwinged aircraft 10 of generally circular configuration. Extending from periphery 11 upward is an upward convex shaped region 12 interrupted by a centrally positioned spherical canopy 14 housing passenger cabin 15. Extending downward, the lower portion of the aircraft consists of lower convex shaped region 16 to which is attached retractable tricycle landing gears 18, 20 and 22, spaced at 120 degree positions equally distant from the center of the aircraft. Lateral movement of the aircraft is assisted or provided by jets 24 positioned at appropriate points on the periphery of the body of the aircraft, as for example at the rear or aft side, as illustrated. Skin covering 26 and 28 on upper convex region 12 and lower convex region 16, respectively, is of open wire mesh construction. This permits air to pass through vertically as driven by counter rotating fan or blade assemblies 30 and 32 (FIG. 3), fan 30 being an upper fan assembly and fan assembly 32 being a lower fan assembly. Fan assembly 30 is formed of variable pitch blades 34, outer supporting ring 36 and inner supporting ring 38. A rack gear 40 (FIG. 4) is provided on the underside of supporting ring 38, which gear engages three idler gears 42 positioned at 120° intervals around passenger cabin 15. Three idler pulleys 46, similarly positioned at 120° intervals around passenger cabin 15 provide an upper support for inner supporting ring 38. Idler gears 42 are provided with locking rims 48 (FIG. 3) and idler pulleys 46 are provided with lateral supporting or locking rims 50, which locking rims extend radially to engage a portion of a side of inner supporting ring 38 and thus together provide lateral as well as vertical support for upper fan assembly 30.

Similarly, lower fan assembly 32 is formed of variable pitch blades 51, inner supporting ring 52, and outer supporting ring 54. Rack 56 on the upper edge of inner ring 52, engages and is vertically supported by idler gears 42. Also, and in a like manner, three idler pulleys 58 spaced at 120° intervals and having lateral supporting or locking rim 60 engage the lower edge of inner ring 52 of lower fan assembly 32. Rim 60 of idler pulleys 58 together with rim 48 of idler gears 42, provide lateral support for lower fan assembly 32. Idler gears 42 and idler pulleys 46 and 58 are supported by means of shafts 62, 64 and 66, respectively, by mounting supports (not shown in detail) on the side wall 68 of passenger cabin 15.

Jet engines 70 are attached to outer ring 36 of upper fan assembly 30 to produce rotation in a first direction and, like jet engines 72 are attached to outer ring 54 of fan assembly 32 and oriented to produce rotation of fan assembly 32 in a direction opposite to fan assembly 30. Fan assemblies 30 and 32 are effectively locked together insofar as speed of rotation is concerned by idler gears 42. Fuel is fed to jet engines 70 and 72 from fuel tank 74 through pipelines 75, 76 and 78 to troughs 80 and 82 on fan assemblies 30 and 32, respectively. This is accomplished by the overlapping of portions of fuel line 76 with trough 80 and of fuel line 78 with trough 82. In this manner, fuel flows without direct physical contact between the troughs and fuel lines, the troughs, of course, moving with the fan assemblies relative to the fuel lines. Fuel is forced out through fuel lines 83 in fan assemblies 30 and 32 by centrifugal force to the peripheral mounted jet engines.

Necessary electrical power is provided to the jet engines by means of commutating or slip-ring contacts 84 and 86, diagrammatically shown in FIG. 5.

Air directors 88, 90 and 92 are held in a fixed position above, between and below fan assemblies 30 and 32 and serve to direct air flow perpendicular to the direction of fan motion; hence, they prevent blade air stall when forward speed of the aircraft exceeds fan tip speed. In addition, there is included movable air directors 94 (FIG. 10) on the same level as lower fixed directors 92, and positioned on each side of the aircraft and employed to provide yaw control for the vehicle in a manner to be described.

Figure 13:
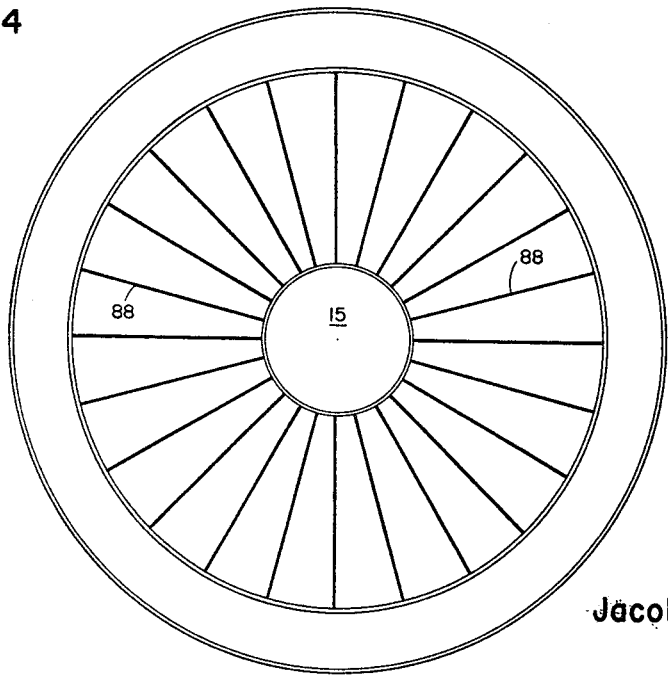
FIG. 13 is a plan view illustrating the arrangement of vertical air directors.

FIG. 13 further illustrates diagrammatically from a plan view perspective, the arrangement of air directors 88.

FIG. 12 shows in a plan view fan jets 70 positioned at 90° intervals about outer supporting ring 36 of upper fan assembly 30 which are employed to drive upper blades 34. Spokes 95 provide reinforcement for the upper and lower (not shown) fan blade assemblies.

Figure 14:
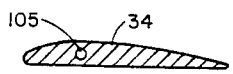
FIG. 14 is a cross-section view showing a fan blade air foil section and the location of the shaft near the center of lift.

FIG. 14 is an enlarged cross-section of a fan air foil blade 34 and mounting member 105.

Variable pitch blades 34 and 51 making up upper fan assembly 30 and lower fan assembly 32, respectively, are driven at a constant speed with lift controlled by controlling the variable pitch of the blades.

The pitch or angle of blades 34 and 51 (FIGS. 3 and 5) is mechanically changeable by blade angle control member assemblies 96 (FIG. 5), associated with each of fan assemblies 30 and 32 and consisting of U-brackets 98 mounted on inner rings 38 and 52 extending as a ring about the fan assemblies and supporting a plurality of spaced spring members 100, which bias movable control ring 102, which in turn is pivotably connected to the trailing edge of each blade by arms 104 to effect angular changes in attitude of blades 34 and 51 by causing the blades to pivot about rotary blade mounting members 105 of inner ring 38 and 52. Control ring 102 is positioned to effect the volume of regional vertical air flow by four control stations 106, 108, 110 and 112 (FIGS. 5, 6 and 9), being located, fore and aft and port (left) and starboard (right), respectively. Each of control stations 106, 108, 110 and 112 includes means for being activated to produce vertical movement on control ring 102 by two mechanical inputs, one superimposed on the other. One input is by means of a general vertical flight control cable 114 (FIGS. 6 and 11) operated by vertical flight control assembly 115 and the other is by means of pitch control cable 116 as to pitch control effected by fore and aft stations 106 and 108 (FIGS. 5, 6, 7 and 9), and by means of roll control cable 117 as to roll control effected by port and starboard control stations 110 and 112.

Engagement between each control station and control ring 102 is accomplished by upper idling roller 118 and lower idler roller 120 (FIG. 5), positioned above and below control ring 102, respectively. Rollers 118 and 120 are mounted by shafts 122 and 124 on one end 126 of right angle arm 128 of each control station. The other end 130 is biased to hold arm 128 in a basically neutral flight position by spring member 132 (in conjunction with spring members 100) coupled between arm end member 133 and supporting brackets 134 and 136 mounted on slidable vertical flight control linkage 138. Slidable vertical flight control linkage 138 is mounted to move vertically in guide members 140 in response to vertical flight control cable 114 coupled through straight control linkages 141 and right angle control linkage 142, the latter being pivoted by pin 144 on cabin sidewall 68.

Local or individual station blade angle of attack control, as for example pitch control, is superimposed on the vertical flight control networks 145, as illustrated in FIG. 6, by means of pitch control cable 116, operated by conventional pitch control column assembly 146 and rotating drum 147 acting on end member 133 of arm 128, the latter being also supported by flight control linkage 138, as described above. In a similar manner, roll control is effected by conventional flight control column wheel assembly 148 coupled to like but port and starboard control stations 110 and 112 by roll control stations 110 and 112 by roll control cable 117 (FIGS. 7 and 9). Control column assembly 146 upon which control wheel assembly 148 is mounted, is in turn rotatably mounted by bushings 149 by conventional means not shown to the frame of passenger cabin 15.

Yaw control is effected by making a portion of the lower directors movable directors. These are designated as movable directors 94 and, by way of example, five port side movable directors 150 and five starboard side directors 152 are shown in FIG. 10. Movable directors 94 are pivotably mounted to the aircraft by pins 154 (FIG. 8) and moved in a fixed spaced relation by connecting arms 156 and 158 (FIG. 10) responsive to yaw control cable 160 as controlled by yaw or rudder pedals 162.

Operation and control of the aircraft is accomplished by a relatively standard type control system as described above. With jet engines 70 and 72 running, take-off is achieved by movement of vertical control assembly 115 to vary the attitude from a zero pitch or neutral position to a position of fan blades 34 and 51 causing air to be forced downward from the top of the aircraft through upper air directors 88, center air directors 90 and lower air directors 92 and 94. With sufficient thrust achieved in this manner, the aircraft will become airborne and continue to rise.

The pilot controls pitch by virtue of movement of conventional pitch control column 146, being movable in a fore and aft line of direction. Typically, and in accord with conventional practice, movement of the control column assembly forward causes the aircraft to pitch downward and moving it aft to cause the aircraft to pitch upward. This control is accomplished by changing the relative pitch of fan blades forward with respect to those aft. Thus, for pitch downward the blades at control station 106 would be decreased in angle of attack and those at control station 108 would be increased in angle of attack.

Roll control is achieved by appropriate rotation of flight control column wheel 148 and wherein a roll downward to the right (and upward to the left) would be produced by reducing fan blade angle attack at station 112 and increasing it at station 110.

Lateral directional heading, as variations in yaw or azimuth, is accomplished by reciprocal deflection of port and starboard director blades 94 by movement of rudder pedals 162. For example, to effect a right turn, starboard movable deflectors 152 would deflect discharged air forward and port movable deflectors 150 would be reciprocally moved to direct discharged air aft.

Forward motion of the aircraft is achieved by application of power in a lateral direction by jets 24 or by holding the vehicle in a slightly pitched or roll direction and thus achieving directional force in the direction of downward pitch or roll by creating a resultant lateral force.

From the foregoing description, it is to be observed that the applicant has provided a novel aircraft comprising a centrally positioned cabin with two sets of fan blades rotating in opposite directions about the cabin. The blades are driven in opposite directions but at equal speeds by virtue of idler gears connecting them. Or, alternately, at least one of the idler gears, as illustrated, would be an engine driven gear and, in which case the outboard jets on the ends of the fan blade assemblies would not be used. Novel means are presented for controlling the aircraft in pitch, yaw, roll, and vertical movement by varying blade pitch and air director angles.

While I have shown a particular aircraft and particular devices and combination of devices in the description and illustration of the aircraft, I contemplate that other detailed devices and combination devices may be employed without departing from the principles and true spirit and scope of the invention as claimed.

What I claim is:
1. An aircraft comprising:
   (a) a centrally positioned cabin, the bottom and top portions of said aircraft being of convex configuration, said convex configuration of said top portion being interrupted by a generally spherical top portion of said centrally positioned cabin;
   (b) a first fan blade assembly supported by said cabin adapted to rotate in a generally horizontal plane in a first direction around said cabin;
   (c) a second fan blade assembly supported below said first fan blade assembly by said cabin and adapted to rotate in a generally horizontal plane in a direction opposite to the rotation of said first fan blade assembly;
   (d) regional control means for selectively varying the angle of attack of the blades of said fan blade assemblies regionally as blades pass through fore, aft, port and starboard regions of said aircraft;
   (e) power drive means for driving said first and second fan blade assemblies in opposite directions but at equal speeds;
   (f) air flow directors adjacent to said first and second fan blade assemblies for controlling the direction of air flow at least at one flow surface of each of said fan blade assemblies and a portion of said air directors being adjustable;
   (g) first control means coupled to air flow with respect to said aircraft for varying the attitude of the aircraft in a pitch mode and comprising means associated with said regional control means for varying the angle of attack of said blades in said fore and aft regions for simultaneously aplying opposite angle of attack control to said blades passing through said fore region with respect to blades passing through said aft region;
   (h) second control means coupled to air flow with respect to said aircraft for varying the attitude of said aircraft in a roll mode and comprising means associated with said regional control means for varying the angle of attack of said blades passing through said port region with respect to blades passing through said starboard region;
   (i) third control means coupled to air flow with respect to said aircraft for varying the attitude of said aircraft in a yaw mode and comprising said portion of said air directors;
   (j) fourth control means coupled to said first and second fan blade assemblies for controlling movement of said aircraft perpendicular to said generally horizontal plane of said fan assemblies and comprising means associated with said regional control means for varying the angle of attack equally of said blades in said fore, aft, port and starboard regions;
   (k) propelling means comprising at least one jet engine positioned at the aft side of said aircraft and oriented to propel said aircraft in a forward direction;
   (l) said fan blade assemblies comprising blades extending between an inner ring support and outer ring support and the inner ring supports of the fan blade assemblies are coupled together by idler gears positioned at 120° intervals about said cabin and are supported vertically to effect constant engagement between said gears and said ring supports by idler rollers engaging rings opposite each said idler gear.

References Cited

UNITED STATES PATENTS

| | | | |
|---|---|---|---|
| 2,473,331 | 6/1949 | Dunley | 170—135.26 |
| 2,777,649 | 1/1957 | Williams | 244—69 X |
| 2,863,621 | 12/1958 | Davis | 244—23 |
| 2,978,205 | 4/1961 | David | 244—23 |
| 3,135,481 | 6/1964 | Sudrow | 244—23 |
| 3,312,425 | 4/1967 | Lennon et al. | 244—23 X |

FOREIGN PATENTS

| | | |
|---|---|---|
| 1,347,733 | 11/1963 | France. |

MILTON BUCHLER, *Primary Examiner.*

B. BELKIN, *Assistant Examiner.*